United States Patent
James et al.

(10) Patent No.: US 10,425,275 B2
(45) Date of Patent: Sep. 24, 2019

(54) CENTRALIZED DISTRIBUTION OF CONFIGURATION PARAMETERS FOR A CLUSTER SERVER

(71) Applicant: Advanced Micro Devices, Inc., Sunnyvale, CA (US)

(72) Inventors: Michael E. James, Austin, TX (US); Justin R. Unger, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 946 days.

(21) Appl. No.: 14/620,365

(22) Filed: Feb. 12, 2015

(65) Prior Publication Data

US 2015/0333957 A1   Nov. 19, 2015

(51) Int. Cl.
*H04L 12/24* (2006.01)

(52) U.S. Cl.
CPC .......... *H04L 41/0806* (2013.01); *H04L 41/04* (2013.01)

(58) Field of Classification Search
CPC .................................. H04L 41/0806
USPC ......................................................... 709/220
See application file for complete search history.

(56) References Cited

U.S. PATENT DOCUMENTS

| 2014/0053149 A1* | 2/2014 | Wu ........................... G06F 8/61 717/176 |
| 2014/0173060 A1* | 6/2014 | Jubran .................. G06F 9/5072 709/220 |

* cited by examiner

*Primary Examiner* — Suraj M Joshi

(57) ABSTRACT

A management node of a server maintains a database of configuration parameters that stores the individual configuration parameters for each compute node. In response to a boot request at a compute node, a configuration parameter control module at the node intercepts locally targeted requests to load configuration parameters. The configuration parameter module sends the requests to the management node and in response the management node sends configuration parameters responsive to the requests. The configuration parameter module provides the configuration parameters to the compute node, thereby emulating a local boot memory for the compute node.

19 Claims, 7 Drawing Sheets

| 170 | 402 | 403 | 404 | 405 |
|---|---|---|---|---|
| | COMPUTE NODE IDENTIFIER | CONFIGURATION PARAMETERS | STATUS | STATUS RESPONSE |
| 401 | 1 | V1=X,V2=Y ••• | TEMP=T1, F=F1 | TEMP—R1, F—R2 |
| | 2 | V1=W,V2=Z ••• | TEMP=T2, F=F2 | TEMP—R3, F—R2 |

•••

CENTRALIZED DISTRIBUTION OF CONFIGURATION PARAMETERS FOR A CLUSTER SERVER

BACKGROUND

Field of the Disclosure

The present disclosure relates generally to processing systems and more particularly to configuration parameters at a cluster server.

Description of the Related Art

High performance computing systems, such as server systems, are sometimes implemented using compute nodes connected together by one or more fabric interconnects. The compute nodes execute software programs to perform designated services, such as file management, database management, document printing management, web page storage and presentation, computer game services, and the like, or a combination thereof. The multiple compute nodes facilitate the processing of relatively large amounts of data while also facilitating straightforward build-up and scaling of the computing system. During a bootstrap process each compute node executes local firmware to configure the compute node for operation based on a set of configuration parameters. This allows each compute node to be individually configured by adjusting the configuration parameters for each node. However, for systems with a large number of compute nodes, adjusting the configuration parameters can be a cumbersome process.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
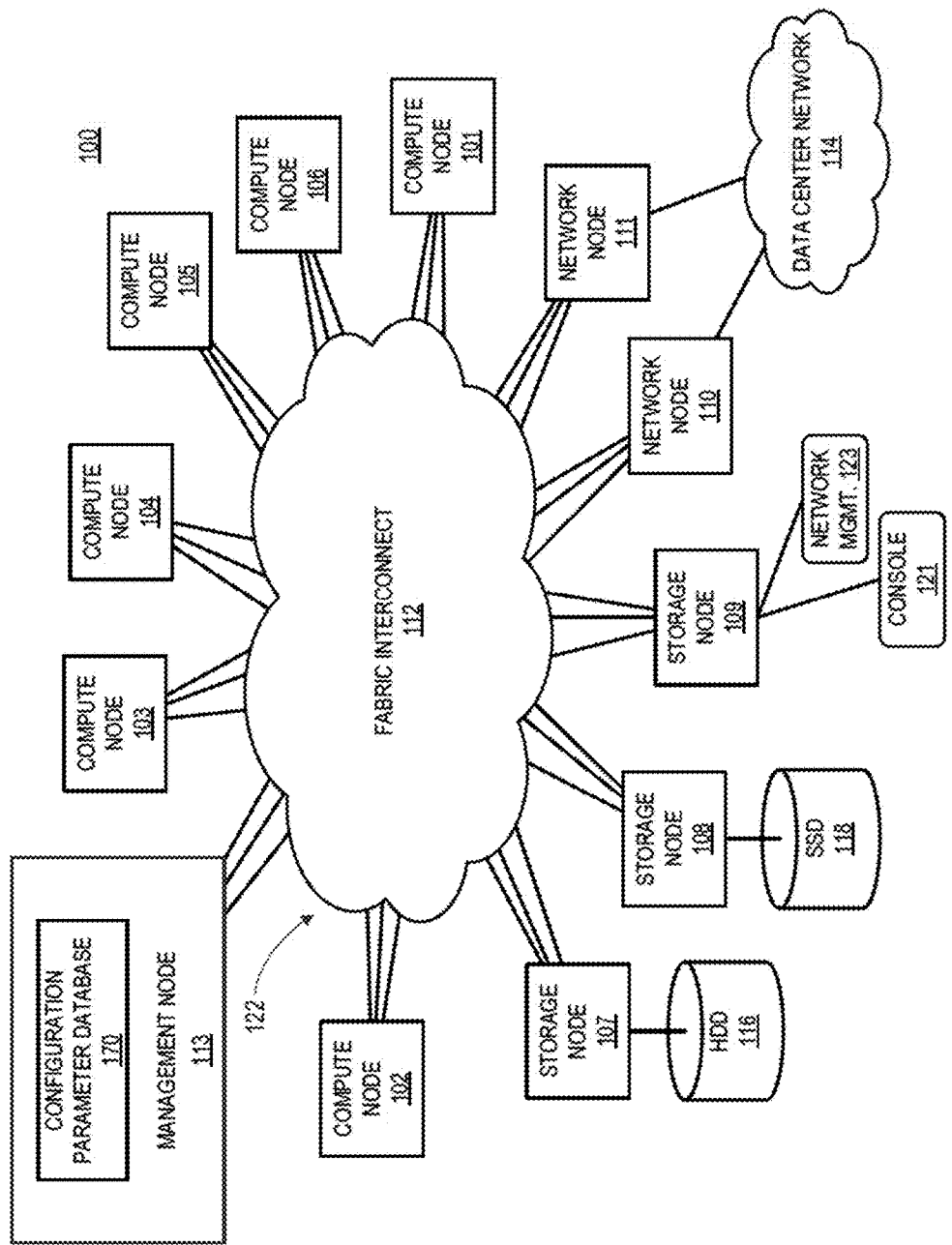
FIG. 1 is a block diagram of a cluster compute server in accordance with some embodiments.

FIGS. 1-9 illustrate example techniques for improving configuration flexibility at a cluster compute server by distributing configuration parameters from a central management node of the server to multiple compute nodes. The management node maintains a database of configuration parameters that stores the individual configuration parameters for each compute node. In response to a boot request at a compute node, a configuration parameter control module at the node intercepts locally targeted requests to load configuration parameters. The configuration parameter module sends the requests to the management node and in response the management node sends configuration parameters responsive to the requests. The configuration parameter module provides the configuration parameters to the compute node, thereby emulating a local boot memory for the compute node.

By storing configuration parameters for multiple compute nodes at the management node adjustment of the configuration parameters can be simplified. For example, in some embodiments the management node can execute a graphical user interface (GUI) program or other interface that allows a user to modify the configuration parameter database. The user can thereby individually and selectively modify the configuration of any of the compute nodes of the server. In a contrast, to modify the configuration of multiple compute nodes in a conventional server, the user must execute separate configuration programs at each compute node. Thus, by distributing configuration parameters from a management node, the server system disclosed herein provides for more flexible and less cumbersome reconfiguration of the system.

As used herein, a configuration parameter for a server system refers to any parameter used as part of an interface between one or more operating systems being executed at the server system and firmware executed at the server system. Examples of configuration parameters include Unified Extensible Firmware Interface (UEFI) variables, Basic Input/Output System (BIOS) variables, boot order variables, key exchange variables, setup and user mode variables, hyperthreading enable variables, platform key variables, and the like. As used herein, bootstrap refers to the process of readying a platform, such as a server, for execution of one or more operating systems in response to a boot request. In some embodiments, bootstrap includes one or more of a pre-EFI (PEI) phase, a Driver Execution Environment (DXE) phase, a System Management Mode (SMM) phase, and Advance Configuration and Power Interface (ACPI) phase, and the like. Accordingly, the provision of configuration information to compute nodes from a management node can take place during any or all of these phases as described herein. In some embodiments, the bootstrap phase includes a phase wherein memory (e.g., DRAM) of the server system is initialized, including by "training" the timing of signals provided to the memory for memory accesses. In some embodiments, the provision of configuration information from the management node to the compute nodes can take place prior to or during this memory initialization phase. In some embodiments, the provision of configuration information from the management node to the compute nodes can take place prior to initialization of a northbridge or a southbridge at a compute node that receives the configuration information.

FIG. 1 illustrates a cluster compute server 100 in accordance with some embodiments. The cluster compute server 100, referred to herein as "server 100", comprises a data center platform that brings together, in a rack unit (RU) system, computation, storage, switching, and server management. The server 100 is based on a parallel array of independent low power compute nodes (e.g., compute nodes 101-106), storage nodes (e.g., storage nodes 107-109), network nodes (e.g., network nodes 110 and 111), and management nodes (e.g., management node 113) linked together by a fabric interconnect 112, which comprises a high-bandwidth, low-latency supercomputer interconnect. Each node is implemented as a separate field replaceable unit (FRU) comprising components disposed at a printed circuit board (PCB)-based card or blade so as to facilitate efficient build-up, scaling, maintenance, repair, and hot swap capabilities.

The compute nodes operate to execute various software programs, including operating systems (OSs), hypervisors, virtualization software, compute applications, and the like. As with conventional server nodes, the compute nodes of the server 100 include one or more processors and system memory to store instructions and data for use by the one or more processors. However, unlike conventional server nodes, in some embodiments the compute nodes do not individually incorporate various local peripherals, such as storage, I/O control, and network interface cards (NICs). Rather, remote peripheral resources of the server 100 are shared among the compute nodes, thereby allowing many of the components typically found on a server motherboard, such as I/O controllers and NICs, to be eliminated from the compute nodes and leaving primarily the one or more processors and the system memory, in addition to a fabric interface device.

After configuration in response to a system reset, the fabric interface device, which may be implemented as, for example, an application-specific integrated circuit (ASIC), operates to virtualize the remote shared peripheral resources of the server 100 such that these remote peripheral resources appear to the OS executing at each processor to be located on corresponding processor's local peripheral bus. These virtualized peripheral resources can include, but are not limited to, mass storage devices, consoles, Ethernet NICs, Fiber Channel NICs, Infiniband™ NICs, storage host bus adapters (HBAs), Universal Serial Bus (USB) devices, Firewire™ devices, PCIe devices, user interface devices (e.g., video, keyboard, and mouse), and the like. This virtualization and sharing of remote peripheral resources in hardware renders the virtualization of the remote peripheral resources transparent to the OS and other local software at the compute nodes. Moreover, this virtualization and sharing of remote peripheral resources via the fabric interface device permits use of the fabric interface device in place of a number of components typically found on the server motherboard. This reduces the number of components implemented at each compute node, which in turn enables the compute nodes to have a smaller form factor while consuming less energy than conventional server blades which implement separate and individual peripheral resources.

The storage nodes and the network nodes (collectively referred to as "input/output (I/O) nodes") implement a peripheral device controller that manages one or more shared peripheral resources. This controller coordinates with the fabric interface devices of the compute nodes to virtualize and share the peripheral resources managed by the resource manager. To illustrate, the storage node 107 manages a hard disc drive (HDD) 116 and the storage node 108 manages a solid state drive (SSD) 118. In some embodiments, any internal mass storage device can mount any processor. Further, mass storage devices may be logically separated into slices, or "virtual disks", each of which may be allocated to a single compute node, or, if used in a read-only mode, shared by multiple compute nodes as a large shared data cache. The sharing of a virtual disk enables users to store or update common data, such as operating systems, application software, and cached data, once for the entire server 100. As another example of the shared peripheral resources managed by the I/O nodes, the storage node 109 manages a console/universal asynchronous receiver-transmitter (UART) 121, and a data center management network 123. The network nodes 110 and 111 each manage one or more Ethernet uplinks connected to a data center network 114. The Ethernet uplinks are analogous to the uplink ports of a top-of rack switch and can be configured to connect directly to, for example, an end-of-row switch or core switch of the data center network 114.

The fabric interface device of the compute nodes, the fabric interfaces of the I/O nodes, and the fabric interconnect 112 together operate as a fabric 122 connecting the computing resources of the compute nodes with the peripheral resources of the I/O nodes. To this end, the fabric 122 implements a distributed switching facility whereby each of the fabric interfaces and fabric interface devices comprises multiple ports connected to bidirectional links of the fabric interconnect 112 and, after configuration of the fabric interconnect 112 in response to a system reset, operate as link layer switches to route packet traffic among the ports in accordance with deterministic routing logic implemented at the nodes of the server 100. Note that the term "link layer" generally refers to the data link layer, or layer 2, of the Open System Interconnection (OSI) model.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect-Express (PCIE) standard, a Rapid IO standard, a Rocket IO standard, a Hyper-Transport standard, a FiberChannel standard, an Ethernet-based standard, such as a Gigabit Ethernet (GbE) Attachment Unit Interface (XAUI) standard, and the like.

Although the FRUs implementing the nodes typically are physically arranged in one or more rows in a server box as described below, the fabric 122 can, during bootstrap or other configuration, logically arrange the nodes in any of a variety of mesh topologies or other network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

In the illustrated example of FIG. 1, the management node 113 includes a configuration parameter database 170. In some embodiments, the configuration parameter database 170 is stored at a storage device (not shown), such as a disk drive, that is local to the management node 113. That is, the storage device is connected to the management node 113, and uses a local bus or other connections, rather than the fabric interconnect 112, to communicate with one or more processors of the management node 113. In other embodiments, all or a portion of the configuration parameter database 170 can be stored remotely at one or more of the storage nodes 107-109 (e.g., at the HDD 116) and the management node 113 can interface with the configuration parameter database via the fabric interconnect 112.

As described further herein, the configuration parameter database 170 includes a set of entries, with each entry corresponding to a different one of the compute nodes 101-106. Each entry stores configuration parameters for the corresponding compute node. The fabric interface device at each compute node includes a configuration control module that monitors one or more local busses of the compute node for requests for configuration parameters. In response to detecting a configuration parameter request for a given configuration variable, the configuration control module sends a message to the management node 113 requesting the configuration variable. In response to the message, the management node 113 accesses the entry of the configuration parameter database 170 corresponding to the compute node that sent the message. The management node 113 retrieves the requested configuration parameter from the accessed entry and communicates it to the configuration control module of the compute node that sent the message. The configuration control module provides the configuration parameter to the processor or other module that generated the request on the local bus.

In some embodiments, the configuration parameter is provided in such a way that it appears to the requesting processor or other module to be a locally provided response to the configuration parameter request. Thus, the management node 113 and the configuration control module together "virtualize" the provision of configuration parameters so that their provision appears to the compute nodes as if the parameters were being provided conventionally from a local memory (e.g., a local read only memory or flash memory that stores boot code or other configuration parameters). This allows the server 100 to provide configuration variables from the centralized management node 113 without redesigning the processors and other hardware of the compute nodes. For example, during bootstrap of the server 100, the management node 113 can receive requests for configuration parameters from each of the compute nodes 101-106, retrieve the requested configuration parameters from the configuration parameter database 170, and distribute the requested configuration parameters to the compute nodes 101-106.

In addition, in some embodiments the management node 113 can receive from the compute nodes 101-106 status reports indicating system status information for the individual nodes, such as bus status, temperature readings, and the like. Conventionally, this status information is reported by each compute node to a local baseband management controller (BMC). By reporting this status information to the management node 113, the status information can be more easily communicated to a system administrator or other user.

Further, in some embodiments the configuration parameter database 170 (or a separate database) can include, for each compute node, status response information for different types of status information. In response to receiving status information for which the status response information indicates a particular response, the management mode can take action to effectuate the response. To illustrate via an example, status information from compute node 103 can indicate a sensed temperature at the node. The configuration parameter database 170 can include status response information for compute node 103 indicating that, when the sensed temperature exceeds a threshold, a clock frequency at the node should be reduced below a threshold frequency. Accordingly, in response to receiving temperature status information from compute node 103 indicating a temperature that exceeds the threshold, the management node 113 can send a configuration parameter or other message to the compute node 103 to adjust the clock frequency at the node to below the threshold frequency. The status response information can be individually set for each compute node, so that different responses are triggered for different nodes, and at different thresholds. For example, the status response information can be set so that, when the compute node 103 indicates a sensed temperature exceeds a threshold T1, the management node 113 reduces the clock frequency at the compute node 103 below the threshold frequency. The status response information can further be set so that, when the compute node 104 indicates a sensed temperature exceeds a threshold T2 (different than T1), the management node 113 triggers an email and text message to a system administrator. Thus, the configuration parameter database 170 allows for flexible and selective implementation of different status response policies for different compute nodes.

As indicated above, the management node 113 communicates with the configuration control modules at the compute nodes 101-106 to receive messages, including error reports, and send configuration parameters. In some embodiments these communications take place over the fabric interconnect 112. In other embodiments these communications take place via a side-band network (not shown), separate from the fabric interconnect 112, that connects the management node 113 and the compute nodes.

Figure 2:
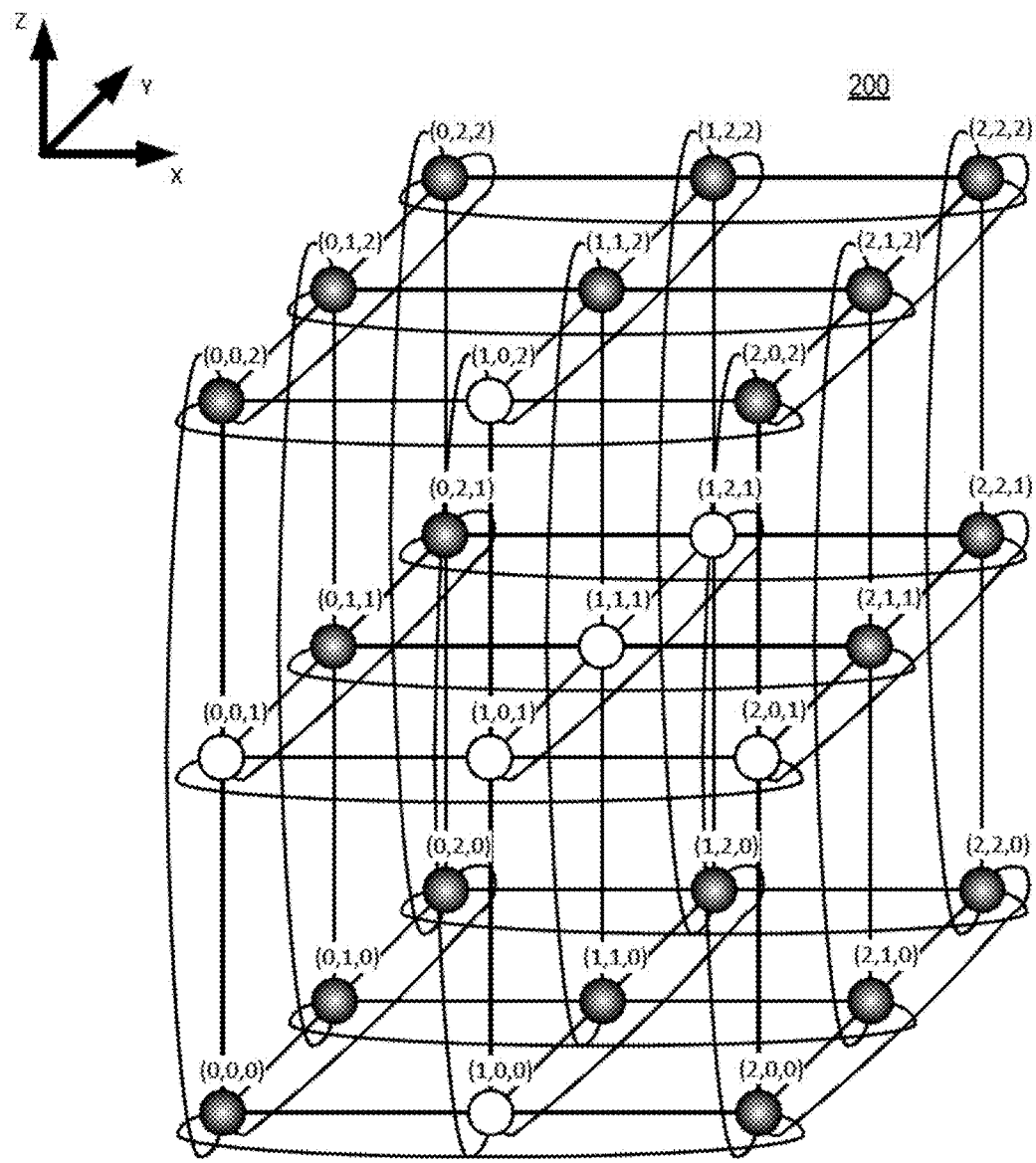
FIG. 2 is a block diagram illustrating an example network topology implemented for a cluster compute server in accordance with some embodiments.

FIG. 2 illustrates an example configuration of the server 100 in a network topology arranged as a k-ary n-cube, or multi-dimensional torus, in accordance with some embodiments. In the depicted example, the server 100 implements a three-dimensional (3D) torus network topology (referred to herein as "torus network 200") with a depth of three (that is, k=n=3). Accordingly, the server 100 implements a total of twenty-seven nodes arranged in a network of rings formed in three orthogonal dimensions (X,Y,Z), and each node is a member of three different rings, one in each of the dimensions. Each node is connected to up to six neighboring nodes via bidirectional serial links of the fabric interconnect 112 (see FIG. 1). The relative location of each node in the torus network 200 is identified in FIG. 2 by the position tuple (x,y,z), where x, y, and z represent the positions of the compute node in the X, Y, and Z dimensions, respectively. As such, the tuple (x,y,z) of a node also may serve as its address within the torus network 200, and thus serve as source routing control for routing packets to the destination node at the location represented by the position tuple (x,y,z).

In some embodiments, in response to a system reset the fabric interconnect 112 configures each node so that one or more media access control (MAC) addresses is temporarily or permanently associated with a given node. Some or all of such associated MAC address may directly represent the position tuple (x,y,z), which allows the location of a destination node in the torus network 200 to be determined and source routed based on the destination MAC address of the packet. During configuration, distributed look-up tables of MAC address to position tuple translations may be cached at the nodes to facilitate the identification of the position of a destination node based on the destination MAC address.

It will be appreciated that the illustrated X,Y, and Z dimensions represent logical dimensions that describe the positions of each node in a network, but do not necessarily represent physical dimensions that indicate the physical placement of each node. For example, the 3D torus network topology for torus network 200 can be implemented via the wiring of the fabric interconnect 112 with the nodes in the network physically arranged in one or more rows on a backplane or in a rack. That is, the relative position of a given node in the torus network 200 is defined by nodes to which it is connected, rather than the physical location of the compute node. In some embodiments, the fabric 122 (see FIG. 1) comprises a plurality of sockets wired together via the fabric interconnect 112 so as to implement the 3D torus network topology, and each of the nodes comprises a field replaceable unit (FRU) configured to couple to the sockets used by the fabric interconnect 112, such that the position of the node in torus network 200 is dictated by the socket into which the FRU is inserted.

In the server 100, after configuration of the fabric interconnect 112, messages communicated between nodes are segmented into one or more packets, which are routed over a routing path between the source node and the destination node. The routing path may include zero, one, or more than one intermediate node. As noted above, each node, including each I/O node, includes an interface to the fabric interconnect 112 that implements a link layer switch to route packets among the ports of the node connected to corresponding links of the fabric interconnect 212. In some embodiments, after configuration these distributed switches operate to route packets over the fabric 122 using source routing or a source routed scheme, such as a strict deterministic dimensional-order routing scheme (that is, completely traversing the torus network 200 in one dimension before moving to another dimension) that aids in avoiding fabric deadlocks. To illustrate an example of strict deterministic dimensional-order routing, a packet transmitted from the node at location (0,0,0) to location (2,2,2) would, if initially transmitted in the X dimension from node (0,0,0) to node (1,0,0) would continue in the X dimension to node (2,0,0), whereupon it would move in the Y plane from node (2,0,0) to node (2,1,0) and then to node (2,2,0), and then move in the Z plane from node (2,2,0) to node (2,2,1), and then to node (2,2,2). The order in which the planes are completely traversed between source and destination may be preconfigured and may differ for each node.

Moreover, as there are multiple routes between nodes in the torus network 200, the fabric 212 can be configured, during the configuration process, for packet traffic to traverse a secondary path in case of a primary path failure. The fabric 212 also can be configured to implement packet classes and virtual channels to more effectively utilize the link bandwidth and eliminate packet loops, and thus avoid the need for link-level loop prevention and redundancy protocols such as the spanning tree protocol.

Conventionally, certain types of nodes are configured to be limited in their routing capabilities during normal execution of software services at the server. For example, compute nodes are permitted to act as intermediate nodes that exist in the routing path of a packet between the source node of the packet and the destination node of the packet, whereas I/O nodes are configured so as to act as only source nodes or destination nodes, and not as intermediate nodes that route packets to other nodes. In the illustrated embodiment, each I/O node is configured to route packets in a similar fashion to the compute nodes, so that all nodes provide similar routing capability.

Figure 3:
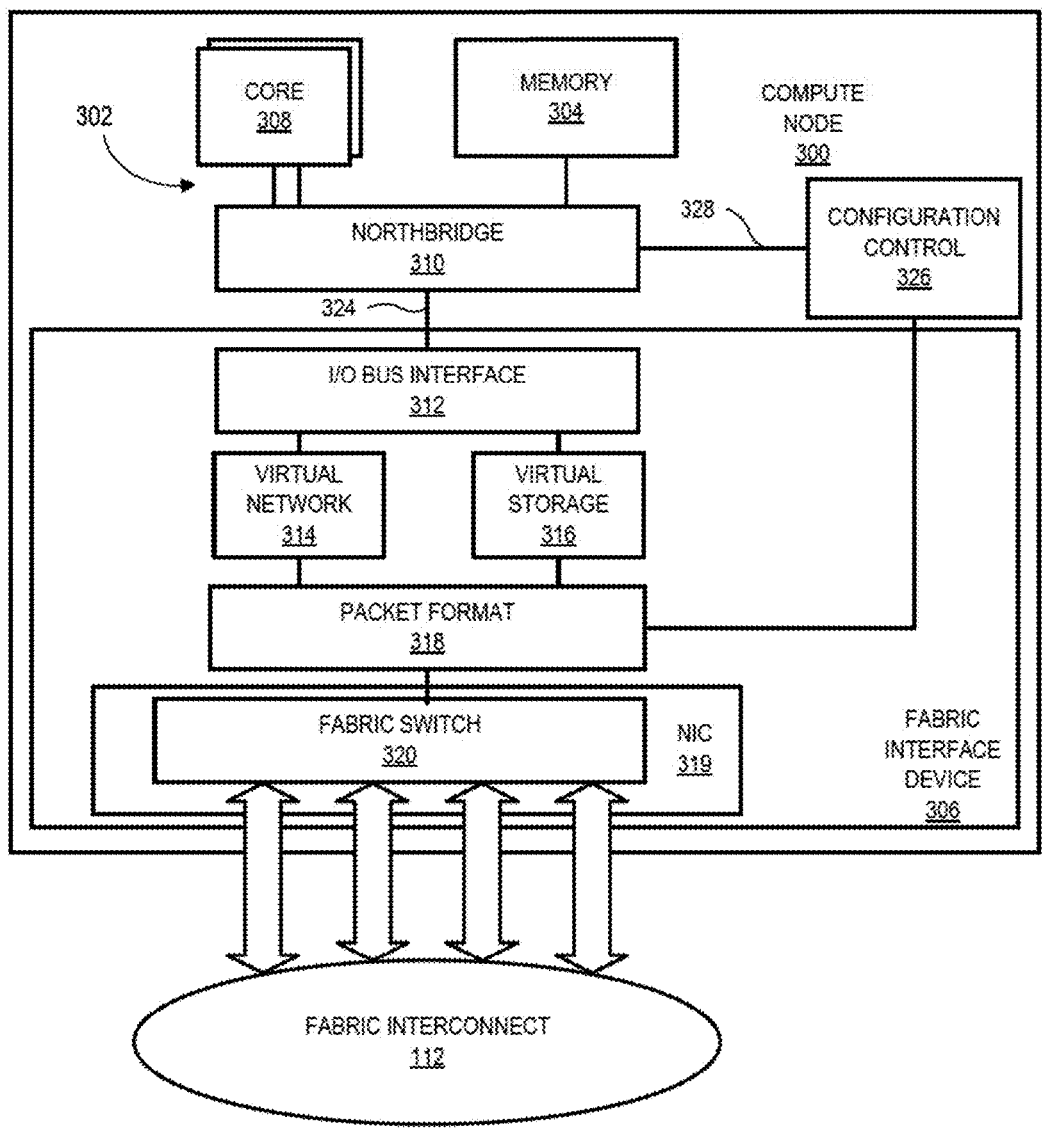
FIG. 3 is a block diagram illustrating an example implementation of a compute node of a cluster compute server in accordance with some embodiments.

FIG. 3 illustrates a compute node 300 implemented in the server 100 of FIG. 1 in accordance with some embodiments. The compute node 300 corresponds to, for example, one of the compute nodes 101-106 of FIG. 1. In the depicted example, the compute node 300 includes a processor 302, system memory 304, and a fabric interface device 306. The processor 302 includes one or more processor cores 308 and a northbridge 310. The one or more processor cores 308 can include any of a variety of types of processor cores, or combination thereof, such as a central processing unit (CPU) core, a graphics processing unit (GPU) core, a digital signal processing unit (DSP) core, and the like, and may implement any of a variety of instruction set architectures, such as an x86 instruction set architecture or an Advanced RISC Machine (ARM) architecture. The system memory 304 can include one or more memory modules, such as DRAM modules, SRAM modules, flash memory, or a combination thereof. The northbridge 310 interconnects the one or more cores 308, the system memory 304, and the fabric interface device 306. The fabric interface device 306, in some embodiments, is implemented in an integrated circuit device, such as an application-specific integrated circuit (ASIC), a field-programmable gate array (FPGA), mask-programmable gate arrays, programmable logic, and the like.

In a conventional computing system, the northbridge 310 would be connected to a southbridge, which would then operate as the interface between the northbridge 310 (and thus the processor cores 308) and one or local more I/O controllers that manage local peripheral resources. However, as noted above, in some embodiments the compute node 300 does not maintain local peripheral resources or their I/O controllers, and instead uses shared remote peripheral resources at other nodes in the server 100. To render this arrangement transparent to software executing at the processor 302, the fabric interface device 306 virtualizes the remote peripheral resources allocated to the compute node such that the hardware of the fabric interface device 306 emulates a southbridge and thus appears to the northbridge 310 as a local southbridge connected to local peripheral resources.

To this end, the fabric interface device 306 includes an I/O bus interface 312, a virtual network controller 314, a virtual storage controller 316, a packet formatter 318, and a NIC 319 comprising a fabric switch 320. The I/O bus interface 312 connects to the northbridge 310 via a local I/O bus 324 and acts as a virtual endpoint for each local processor core 308 by intercepting requests addressed to virtualized peripheral resources that appear to be on the local I/O bus 324 and responding to the requests in the same manner as a local peripheral resource, although with a potentially longer delay due to the remote location of the peripheral resource being virtually represented by the I/O bus interface 312.

While the I/O bus interface 312 provides the physical interface to the northbridge 310, the higher-level responses are generated by the virtual network controller 314 and by the virtual storage controller 316. Requests sent over I/O bus 324 for a network peripheral connected to an external network, such as an Ethernet NIC connected to the data center network 114 (FIG. 1), are routed by the I/O bus interface 312 to the virtual network controller 314, while storage requests are routed by the I/O bus interface 312 to the virtual storage controller 316. The virtual network controller 314 provides processing of incoming and outgoing requests based on, for example, an Ethernet protocol. The virtual storage controller provides processing of incoming and outgoing requests based on, for example, a serial ATA (SATA) protocol, a serial attached SCSI (SAS) protocol, a Universal Serial Bus (USB) protocol, and the like.

After configuration of each of the compute nodes, the compute node 300 executes software services that generate requests. After being processed by either the virtual network controller 314 or the virtual storage controller 316, requests are forwarded to the packet formatter 318, which encapsulates the request into one or more packets. The packet formatter 318 then determines the fabric address or other location identifier of the I/O node managing the physical peripheral resource intended for the request. The packet formatter 318 adds the identified fabric address (referred to herein as the "fabric ID") to the headers of the one or more packets in which the request is encapsulated and provides the packets to the fabric switch 320 of the NIC 519 for transmission.

As illustrated, the fabric switch 320 implements a plurality of ports, each port interfacing with a different link of the fabric interconnect 112. To illustrate using the 3×3 torus network 200 of FIG. 2, assume the compute node 300 represents the node at (1,1,1). In this example, the fabric switch 320 would have at least seven ports to couple it to seven bi-directional links: an internal link to the packet formatter 318; an external link to the node at (0,1,1); an external link to the node at (1,0,1), an external link to the node at (1,1,0), an external link to the node at (1,2,1), an external link to the node at (2,1,1), and an external link to the node at (1,1,2). After configuration of the compute node 300, control of the switching of data among the ports of the fabric switch 320 is determined based on integrated deterministic switching logic, which specifies the egress port based on the destination address (that is, destination fabric ID) indicated by the packet and based on the deterministic routing implemented in the server 100. The destination fabric ID of each compute node can be distributed to the respective nodes during configuration.

After configuration by the management node 113, and during normal execution of software services, the compute node 300 handles received packets as follows. For packets received from another other node, wherein the packet's destination is the compute node 300, the fabric switch 320 routes the incoming packet to the port connected to the packet formatter 318 based on the deterministic routing logic. The packet formatter 318 then de-encapsulates the response/request from the packet and provides it to either the virtual network controller 314 or the virtual storage controller 316 based on a type-identifier included in the request. The controller receiving the request then processes the response/request and controls the I/O bus interface 312 to signal the request to the northbridge 310, whereupon the response/request is processed as though it were a response or request from a local peripheral resource.

For a transitory unicast packet for which the compute node 300 is an intermediate node in the routing path for the packet, the fabric switch 320 determines the destination address (e.g., the tuple (x,y,z)) from the header of the transitory packet, and provides the packet to a corresponding output port identified by the deterministic routing logic. In some embodiments, the fabric switch 320 determines the destination address using a locally stored routing table.

The fabric interface device 306 includes a configuration control module 326 to monitor one or more busses of the northbridge 310 or the processor 302 for requests for configuration parameters. In some embodiments, the configuration control module 326 is a hardware module connected to the northbridge 310 either through the local I/O bus 324 or via a separate low pin count (LPC) bus 328. In operation, the configuration control module 326 facilitates emulation of a local store of configuration parameters (e.g., a local non-volatile store) by monitoring for configuration parameter requests from the northbridge 310. In some embodiments, the configuration control module 326 is code that is loaded and executed at the compute node 300 during bootstrap of the node. For example, in response to a boot request, the processor 302 can execute predefined or hardwired operations that cause the processor 302 to request the code of the configuration control module 326 from the management node 113. The management node 113 provides the code, which is executed by the processor 302 or other hardware of the compute node 300. The configuration control module 326 intercepts requests for configuration parameters that are generated by the processor 302 during bootstrap, and communicates those requests to the management node 113. In response to each request, the management node 113 provides the requested configuration parameter to the configuration control module 326, which in turn provides the configuration parameter to the processor 302. In some embodiments, the configuration parameter requests are generated by the processor 302 as if they were targeted to a local store of configuration parameters, and responses to the intercepted requests are provided by the configuration control module 326 to the processor 302 in the same form as if they were retrieved from a local store.

In some embodiments, the configuration control module 326 maintains a list of memory addresses, referred to for purposes of description as configuration parameter addresses, that are specified for the processor 302 as addresses for configuration parameters. The configuration control module 326 monitors the busses of the northbridge 310 for memory access requests (e.g., read requests) that target the memory addresses in the list. In response to detecting a memory access request targeting a configuration parameter address in its maintained list, the configuration control module identifies the access request as a configuration parameter request.

In response to identifying a configuration parameter request, the configuration control module 326 forwards the request to the management node 113 via the fabric switch 320. The management node 113 identifies the compute node 300 based on a header of the request and accesses the entry of the configuration parameter database 170 corresponding to the compute node 300. The management node 113 retrieves the configuration parameter indicated by the request incorporated in the packet and supplies the configuration parameter to the fabric switch 320 in a responsive packet. The configuration control module 326 provides the configuration parameter in the responsive packet in turn to the northbridge 310, which communicates the configuration parameter according to the configuration process for the processor 302.

To illustrate via an example, in response to a boot request (e.g., a power cycling of the server 100) the processor 302 initiates the bootstrap process by loading a predefined address, referred to as a reset vector, into a program counter register and issues a read request targeting the reset vector. The configuration control module 326 identifies the reset vector as an address that corresponds to a request for a configuration parameter. In response, the configuration control module 326 sends a packet including the reset vector to the management node 113, which identifies an entry of the configuration parameter database 170 corresponding to the compute node 300. The management node 113 identifies the configuration parameter corresponding to the reset vector, and communicates the configuration parameter to the configuration control module 326, which in turn provides the parameter as a response to the read request.

In some embodiments, the configuration parameter corresponding to the reset vector is a jump instruction indicating an address of another configuration parameter. The processor 302 executes the jump instruction by generating a read request targeting the jump address. The configuration control module 326 determines that the jump address targets another configuration parameter and therefore sends a request for the configuration parameter associated with the jump address to the management node 113. The configuration control module 326 and management node 113 continue in this fashion to provide configuration parameters to the processor 302. At some point during configuration, one or more configuration parameters (e.g., a set of load instructions) can load an operating system at memory local to the compute node 300, and another configuration parameter (e.g., another jump instruction) can cause the processor 302 to issue instructions to execute the operating system from the local memory. The configuration control module 326 does not intercept the read requests to execute the operating system, but allows those requests to be satisfied at the local memory. Control of the compute node 300 to the operating system is thereby handed off to the operating system.

Figures 4, 5:
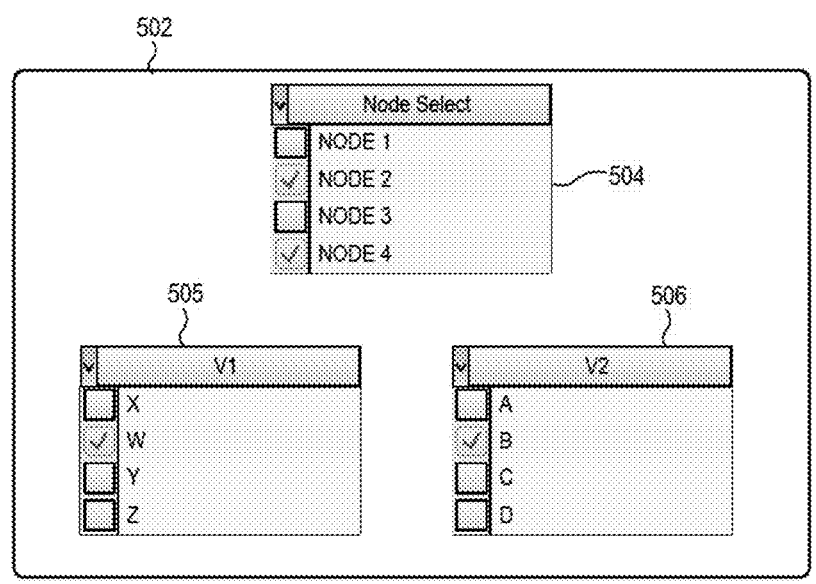
FIG. 4 is a diagram illustrating an example of the configuration parameter database of FIG. 1 in accordance with some embodiments.
FIG. 5 is a diagram illustrating a graphical user interface to modify the database of FIG. 1 in accordance with some embodiments.

FIG. 4 illustrates a block diagram of the configuration parameter database 170 in accordance with some embodiments. In the depicted example, the configuration parameter database 170 includes number of entries (e.g., entry 401). Each entry includes a least two fields: a compute node identifier field 402, a configuration parameters field 403, a status field 404, and a status response field 405. The compute node identifier field 402 indicates the compute node assigned to the corresponding entry. Thus in the illustrated example the entry 401 is assigned to Compute Node 1. The configuration parameters field 403 indicates the values of the configuration parameters for the compute node indicated in the compute node identifier field 402. The status field 404 indicates, for each of a plurality of status items (e.g., temperature, bus operation state, clock frequency), the state of each item as reported by status messages received from the corresponding compute node. The status response field indicates, for one or more status items of the status field 404, one or more triggering events and the corresponding responses the management node 113 is to take in response to the corresponding trigger event. Note that in some embodiments the status field 404 and status response field 405 are stored in a separate database from the configuration parameters field 403.

In response to receiving a request for a configuration parameter the management node 113 identifies, based on the compute node identifier field 403, the entry of the configuration parameter database 170 that corresponds to the compute node that sent the request. The management node 113 then identifies the value for the requested configuration parameter as indicated in the configuration parameters field 403, and communicates the value in response to the configuration parameter request.

In some embodiments, the management node 113 can receive requests from an operating system or other program executing at a given compute node to modify a configuration parameter at the configuration parameter database 170. In response, the management node 113 compares the request to a security policy, and based on the comparison makes the change as requested, makes a different change to the configuration variable, or declines to change the configuration parameter. For example, in some scenarios the security policy may allow the requesting operating system to make the change as requested, and the management node 113 therefore makes the change to the configuration parameter. In other scenarios, the security policy can allow the operating system to make some change to the configuration parameter, but not the specific change requested by the operating system. For example, the operating system may request that a clock frequency of a compute node be changed to 200 MHz, but the security policy can indicate a maximum permitted clock speed of 175 MHz for the compute node. In such a scenario, the management node 113 can change the configuration parameter to the maximum permitted clock speed in response to the operating system's request. In still other scenarios, the security policy can indicate that the operating system is not permitted to be changed, and in response can decline to make the requested change, and take other remedial action, such as reporting an unauthorized request to a system administrator, a security program, or other entity.

In response to receiving a status message from a compute node, the management node 113 updates the corresponding status field to reflect the status indicated by the message. The management node 113 also reviews the status response field for the compute node to see if the status message indicates one of the triggering events and, if so, executes the corresponding response. Examples of responses to triggering events can include contacting a system administrator or other designated persons (e.g., via email, paging, text, printing a message to a screen, or any combination thereof) and adjusting one or more parameters at a compute node, such as a clock speed.

In some embodiments, the entries of the configuration parameter database 170 can be modified via a graphical user interface (GUI). FIG. 5 illustrates an example GUI 502 in accordance with some embodiments. The GUI 502 includes a node selection window 504 and parameter value windows 505 and 506. The node selection window 504 provides a selectable list of the compute nodes of the server 100. The parameter value windows 505 and 506 provide a selectable list of values for a corresponding configuration parameter.

In order to set a configuration parameter for a compute node, a user selects the compute node the node selection window 504. The user identifies the parameter value window for the parameter to be set, and uses the window to select the value for that parameter. It will be appreciated that in some embodiments the parameter value windows can include, in addition to or instead of a selectable list of values, a text entry box that allows the user to enter text strings or other values for a configuration variable. Other types of data entry windows can also be employed.

In response to a user selecting a value for a configuration parameter at a compute node, the management node 113 selects the entry of the configuration parameter database corresponding to the compute node. The management node 113 then sets the value for that configuration parameter as indicated in the corresponding parameter value window. In some embodiments, the user can select multiple compute nodes at the node selection window 504 and the management node 113 sets the configuration parameters to the selected values for each of the selected compute nodes. This provides a convenient and flexible way for the user to concurrently set the configuration variables for multiple compute nodes. To illustrate via an example, in some scenarios the user may desire to set a boot target address to the same value for multiple compute nodes. Accordingly, the user selects each of the multiple compute nodes at the node selection window 504 and sets the value of the boot target address at the corresponding parameter selection window. In response, the management node stores the boot target address parameter at each entry of the configuration parameter database 170 corresponding to a compute node selected at the node selection window 504. The boot address is thus changed for each of the selected compute nodes. In contrast, because a conventional server stores configuration parameters locally at each compute node, in order to change a parameter value the conventional server requires the user to execute a separate interface program at each compute node, increasing the time, expense, and inconvenience of changing compute node configuration.

In some embodiments, the GUI 502 can include an interface (not shown) to select triggering events and corresponding responses for status messages from individual compute nodes. This interface changes the information at the status response field 405 for a corresponding node. In some embodiments, the status response field 405 is set to one or more default values, reflecting corresponding default trigger events and responses, and these default events and responses can be changed via the GUI 502.

Figure 6:
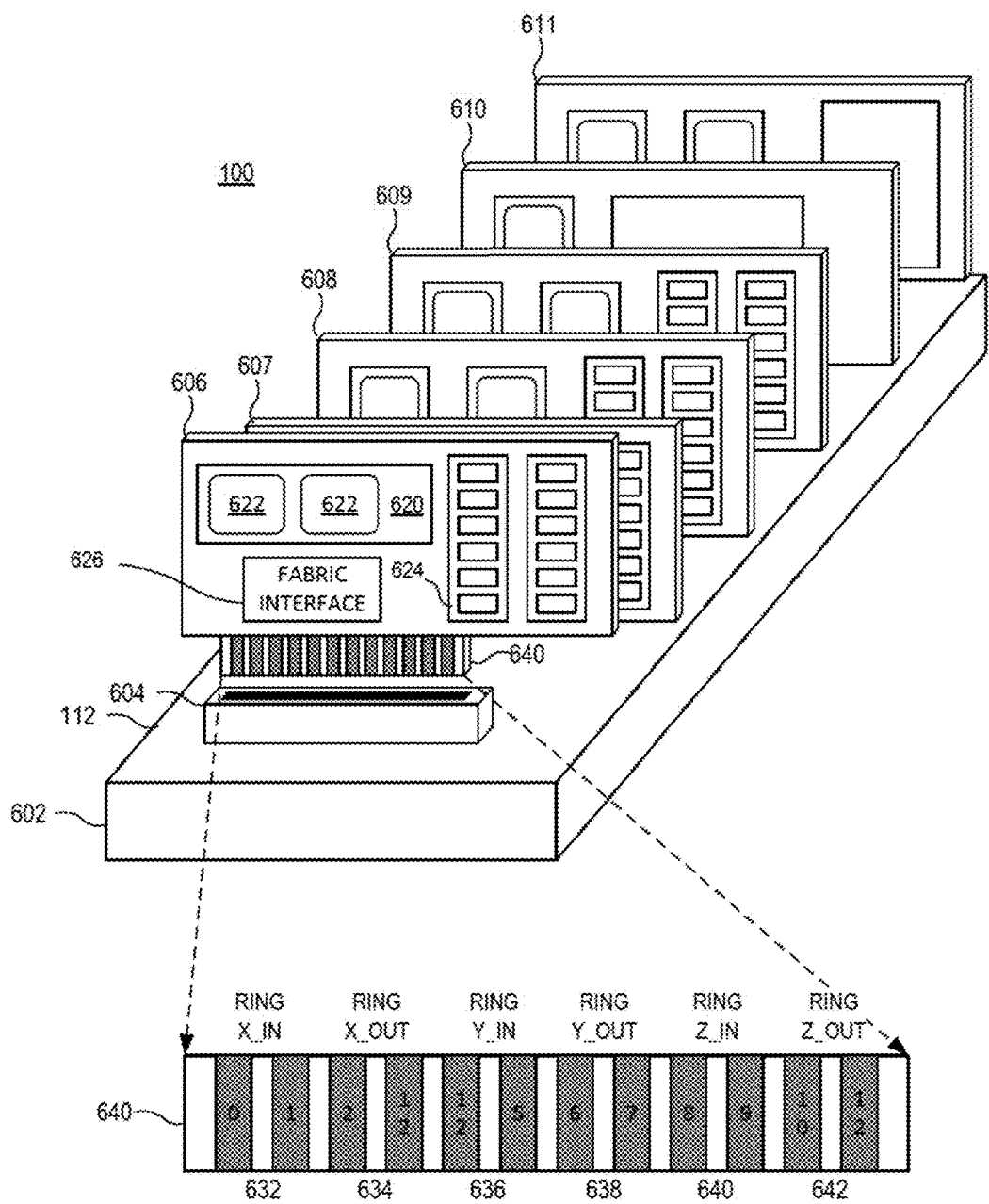
FIG. 6 is a block diagram illustrating an example physical arrangement of nodes of a cluster compute server in accordance with some embodiments.

FIG. 6 illustrates an example physical arrangement of nodes of the server 100 in accordance with some embodiments. In the illustrated example, the fabric interconnect 112 (FIG. 1) includes one or more interconnects 602 having one or more rows or other aggregations of plug-in sockets 604. The interconnect 602 can include a fixed or flexible interconnect, such as a backplane, a printed wiring board, a motherboard, cabling or other flexible wiring, or a combination thereof. Moreover, the interconnect 602 can implement electrical signaling, photonic signaling, or a combination thereof. Each plug-in socket 604 comprises a card-edge socket that operates to connect one or more FRUs, such as FRUs 606-611, with the interconnect 602. Each FRU represents a corresponding node of the server 100. For example, FRUs 606-609 may comprise compute nodes, FRU 610 may comprise a network node, and FRU 611 can comprise a management node.

Each FRU includes components disposed on a PCB, whereby the components are interconnected via metal layers of the PCB and provide the functionality of the node represented by the FRU. For example, the FRU 606, being a compute node in this example, includes a PCB 612 implementing a processor 620 comprising one or more processor cores 422, one or more memory modules 624, such as DRAM dual inline memory modules (DIMMs), and a fabric interface device 626. Each FRU further includes a socket interface 640 that operates to connect the FRU to the interconnect 602 via the plug-in socket 604.

The interconnect 602 provides data communication paths between the plug-in sockets 604, such that the interconnect 602 operates to connect FRUs into rings and to connect the rings into a 2D- or 3D-torus network topology, such as the torus network 200 of FIG. 2. The FRUs take advantage of these data communication paths through their corresponding fabric interfaces, such as the fabric interface device 626 of the FRU 606. The socket interface 640 provides electrical contacts (e.g., card edge pins) that electrically connect to corresponding electrical contacts of plug-in socket 604 to act as port interfaces for an X-dimension ring (e.g., ring-X_IN port 332 for pins 0 and 1 and ring-X_OUT port 334 for pins 2 and 3), for a Y-dimension ring (e.g., ring-Y_IN port 336 for pins 4 and 5 and ring-Y_OUT port 338 for pins 6 and 7), and for an Z-dimension ring (e.g., ring-Z_IN port 340 for pins 8 and 9 and ring-Z_OUT port 342 for pins 10 and 11). In the illustrated example, each port is a differential transmitter comprising either an input port or an output port of, for example, a PCIE lane. A skilled artisan will understand that a port can include additional TX/RX signal pins to accommodate additional lanes or additional ports.

Figure 7:
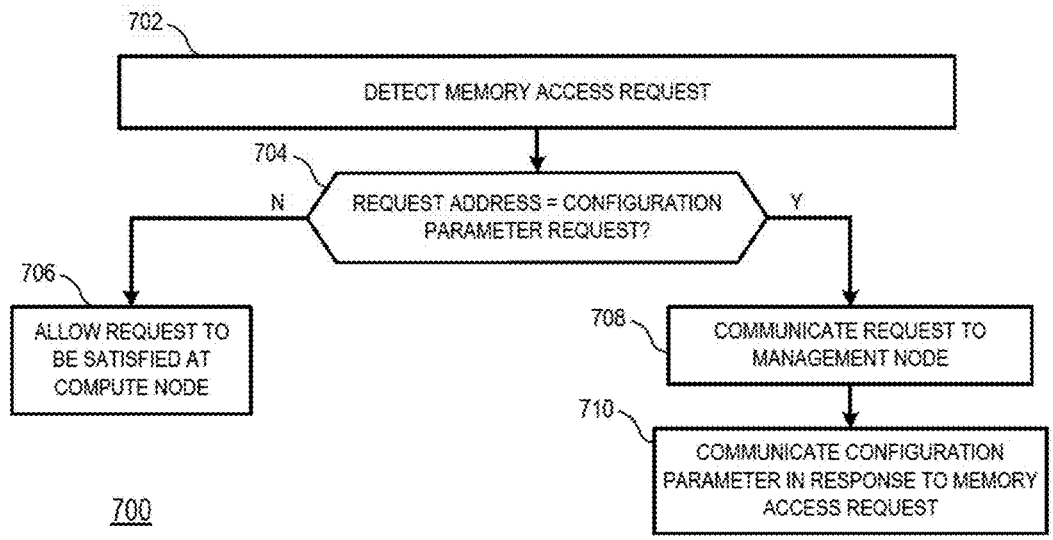
FIG. 7 is a flow diagram illustrating an example method of distributing configuration parameters to compute nodes from a management node of a cluster compute server in accordance with some embodiments.

FIG. 7 is a flow diagram of a method 700 of monitoring requests for configuration parameters at the server 100 in accordance with some embodiments. At block 702 the configuration control module 326 detects a memory access request at the northbridge 310. In response, at block 704 the configuration control module 326 determines whether the memory address targeted by the memory access request matches an address on a stored list of memory addresses assigned to configuration parameters. If not, the method flow moves to block 706 and the configuration control module 326 allows the memory access request to be satisfied at the compute node 300.

Returning to block 704, if the memory address of the memory access request matches an address on the list of memory addresses assigned to configuration parameters the method flow moves to block 708 and the configuration control module 326 communicates to the management node 113 a configuration parameter request for the configuration parameter assigned to the memory address targeted by the memory access request. At block 710 the configuration control module 326 receives the configuration parameter from the management node 113 and communicates the configuration parameter to the northbridge 310 as a response to the memory access request.

Figure 8:
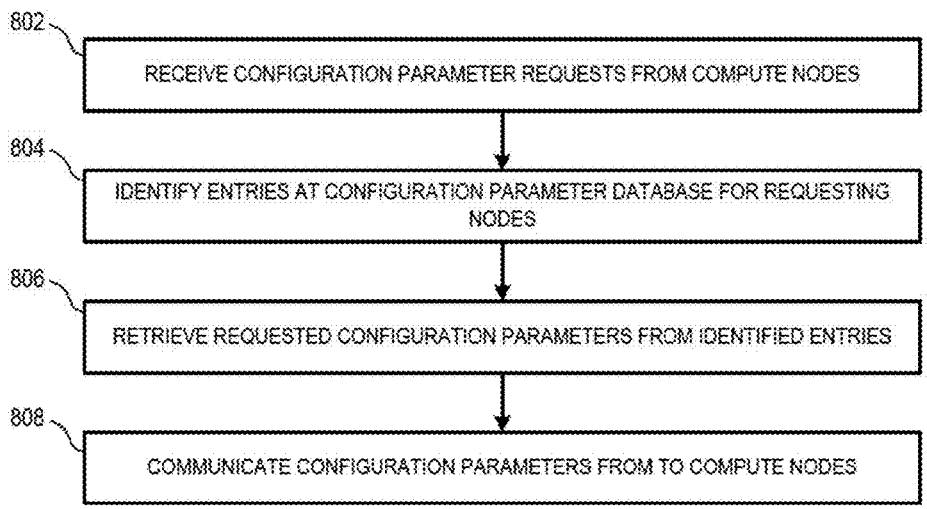
FIG. 8 is a flow diagram illustrating an example method of identifying requests for configuration parameters at a compute node of a cluster compute server in accordance with some embodiments.

FIG. 8 illustrates a flow diagram of a method 800 of distributing configuration parameters from the management node 113 to the compute nodes 101-106 in accordance with some embodiments. At block 802 the management node 117 receives a plurality of configuration parameter requests during bootstrap of the server 100, with at least some of the plurality being received from different ones of the compute nodes 101-106. At block 804 the management node 113 identifies, for each received configuration parameter request, the entry of the configuration parameter database 170 corresponding to the compute node that sent the request. At block 806 the management node 113 retrieves, from the identified entries, the configuration parameters requested in the plurality of configuration parameter requests. At block 808 the management node 113 sends the retrieved configuration parameters to the respective compute nodes that sent the plurality of configuration parameter requests.

In some embodiments, the apparatus and techniques described above are implemented in a system comprising one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 9:
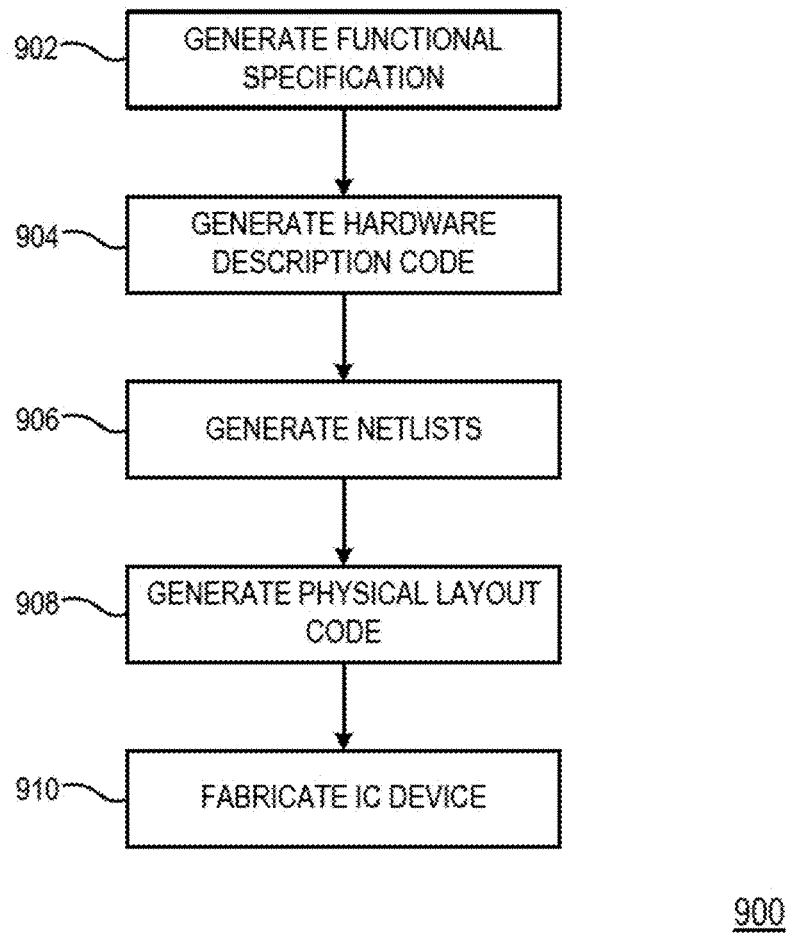
FIG. 9 is a flow diagram illustrating a method for designing and fabricating an integrated circuit device implementing at least a portion of a component of a processing system in accordance with some embodiments.

FIG. 9 is a flow diagram illustrating an example method 900 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink, or MATLAB.

At block 904, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 906 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 908, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A server system, comprising:
   a plurality of compute nodes to execute services for the server system, at least one of the plurality of compute nodes comprising a first processor;
   a management node to send configuration parameters to the plurality of compute nodes during bootstrap of the server system, the management node comprising a second processor; and
   wherein a compute node of the plurality of compute nodes comprises a boot control module to intercept a request for a configuration parameter formatted to target a local memory of the compute node and to communicate the request for the configuration parameter to the management node.

2. The server system of claim 1, wherein the management node is to send a first set of configuration parameters to a first compute node of the plurality of compute nodes and a second set of configuration parameters to a second compute node of the plurality of compute nodes during bootstrap of the server system, the second set of configuration parameters different than the first set of configuration parameters.

3. The server system of claim 1, wherein the management node is to receive status messages from the plurality of compute nodes and is to adjust the configuration parameters based on the status messages.

4. The server system of claim 1, wherein the management node is to send the configuration parameters to the plurality of compute nodes via a fabric interconnect used to communicate messages between compute nodes after bootstrap of the server system.

5. The server system of claim 4, wherein the management node is to send the configuration parameters to the plurality of compute nodes via a sideband network different than the fabric interconnect used to communicate messages between compute nodes after bootstrap of the server system.

6. The server system of claim 1, wherein the management node is to receive a request from a compute node to change a configuration parameter and is to change the configuration parameter in response to the request based on a security policy.

7. The server system of claim 6, wherein the management node is to make a different change to the configuration parameter than the requested change based on the security policy.

8. The server system of claim 1, wherein the management node is to store a database of configuration parameters, the database to indicate a state of configuration parameters for each of the plurality of compute nodes and is to provide an interface to the database.

9. The server system of claim 8, wherein the management node is to store a database of status information to indicate a status for each of the plurality of compute nodes and responsive actions to take based on triggering events associated with the status information.

10. A server system, comprising:
    a fabric interconnect to route messages;
    a plurality of field replaceable units (FRUs) comprising a plurality of compute nodes coupled to the fabric interconnect to execute services for the server system, each of the plurality of compute nodes to route received messages to others of the plurality of compute nodes, at least one of the compute nodes comprising a first processor; and
    a first FRU comprising a management node coupled to the fabric interconnect to send configuration parameters to the plurality of compute nodes in response to a request to boot the server system, the management node comprising a second processor; and
    wherein at least one of the plurality of compute nodes comprises a boot control module to intercept a request for a configuration parameter formatted to target a local memory of the compute node and to communicate the request for the configuration parameter to the management node.

11. The server system of claim 10, wherein the management node is to send a first set of configuration parameters to a first compute node of the plurality of compute nodes and a second set of configuration parameters to a second compute node of the plurality of compute nodes, the second set of configuration parameters different than the first set of configuration parameters.

12. The server system of claim 10, wherein the management node is to receive status messages from the plurality of compute nodes and is to adjust the configuration parameters based on the status messages.

13. The server system of claim 10, wherein the management node is to send the configuration parameters to the plurality of compute nodes via a fabric interconnect used to communicate messages between compute nodes after bootstrap of the server system.

14. The server system of claim 10, wherein the management node is to send the configuration parameters to the plurality of compute nodes via a sideband network different than the fabric interconnect.

15. The server system of claim 10, wherein the management node is to receive a request from a compute node to change a configuration parameter and is to change the configuration parameter in response to the request based on a security policy.

16. The server system of claim 15, wherein the management node is to make a different change to the configuration parameter than the requested change based on the security policy.

17. A method, comprising:
    receiving, at a management node of a server system having a plurality of compute nodes coupled via a fabric interconnect, a first request to boot the server system, the management node comprising a first processor and at least one of the plurality of compute nodes comprising a second processor separate from the first processor;
    intercepting at one of the plurality of compute nodes a second request for a configuration parameter formatted to target a local memory of the compute node;
    in response to intercepting the second request, communicating the second request to the management node; and
    in response to the second request, communicating configuration parameters from the management node to the plurality of compute nodes.

18. The method of claim 17, wherein communicating configuration parameters comprises:

sending a first set of configuration parameters to a first compute node of the plurality of compute nodes; and sending a second set of configuration parameters to a second compute node of the plurality of compute nodes, the second set of configuration parameters different than the first set of configuration parameters.

19. The method of claim 17, further comprising:

receiving at the management node status messages from the plurality of compute nodes; and adjusting the configuration parameters based on the status messages.

* * * * *